United States Patent Office 3,486,546
Patented Dec. 30, 1969

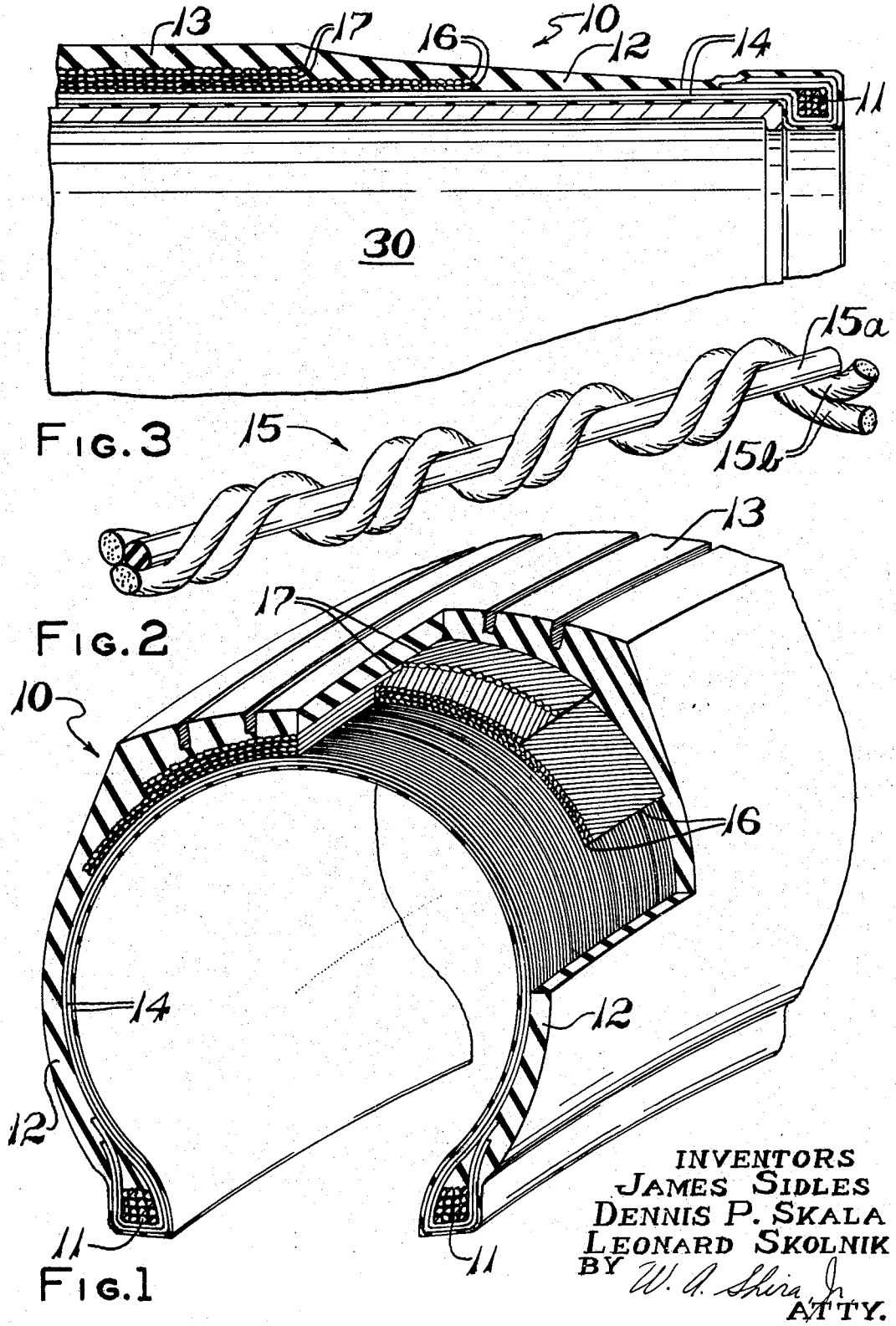

3,486,546
PNEUMATIC TIRE

James Sidles, West Richfield, Dennis P. Skala, Akron, and Leonard Skolnik, Cleveland, Ohio, assignors to The B. F. Goodrich Company, New York, N.Y., a corporation of New York
Filed Dec. 15, 1967, Ser. No. 691,053
Int. Cl. B60c 9/10
U.S. Cl. 152—330                  6 Claims

ABSTRACT OF THE DISCLOSURE

A pneumatic tire of the type having a carcass of elastomeric material and radially disposed reinforcing cords of inextensible material and surmounted by an annular band of reinforcing cords disposed at a small angle to the axial mid-plane of the tire, characterized by the latter cords being capable of predetermined elongation thereby permitting the carcass and annular band to be fabricated completely on a cylindrical tire building drum before shaping the tire to a generally toroidal configuration. The annular band may also have some portions extending to the region of maximum cross section of the carcass.

Background of the invention

A tire having radially disposed carcass reinforcing cords and a circumferentially extending inextensible belt, or overhead, beneath the tread possesses characteristics that result in improved tire performance among which are increased tread wear, decreased rolling resistance and better cornering ability. Such tires have, however, been more difficult to make than the so-called "conventional" or "bias" cord tires wherein the carcass reinforcing cores extend from bead-to-bead in adjacent layers and cross the circumferential plane of symmetry at opposite acute angles.

The manufacture of bias-angle carcass tires is most commonly performed by sequentially laminating layers of rubber-covered parallel extending cords and the rubber stock for forming the tread in flat-band form upon a cylindrical drum. The uncured tire is then expanded radially outwardly at the tread region and the beads are moved axially toward the center to a generally toroidal configuration just prior to or at the time the carcass is inserted into the vulcanizing mold. This is possible since the arrangement of the cords diagonally or on a "bias" angle in the carcass permits repositioning by a pantographing action as the carcass is shaped from the flat band to the toroidal configuration.

Heretofore, complete fabrication of radial cord tires in flat band form on a single cylindrical building drum has not been possible. This is due to the fact that the circumferentially extending belt or girdle of low angle reinforcing cords in the crown region of such tires is substantially inextensible in the circumferential direction. Hence, while the radially extending plies of the carcass can be assembled and the bead cores applied upon a conventional cylindrical tire building drum, the incomplete flat band tire must either be removed from the building drum or an expandable building drum employed to shape the carcass to the generally toroidal configuration prior to the application of the belt or girdle and the tread stock. This has either necessitated a two-step building process or the use of a specially constructed building drum. In either case, labor and machinery costs are greater than for conventional tires.

Summary of the invention

The present invention provides a solution for the above-identified problem of expense in building radial tires in that a tire having a carcass of radially extending cord reinforcement surmounted by a belt or girdle of generally circumferentially extending cords can be completely fabricated in flat band form on a conventional tire building drum before it is expanded to the generally toroidal shape.

This is made possible, while employing conventional substantially inextensible reinforcing cords disposed axially of the carcass band, by utilizing for the circumferentially extending belt or girdle a plurality of plies of low bias angle reinforcing cords which have initially a low tensile modulus until stretched a predetermined and limited amount and then abruptly change to a much higher modulus so that they become substantially inextensible. These cords of predetermined stretchability comprise textile yarns helically wrapped around a pre-vulcanized continuous core of elastomeric material with the size of the core and wrapping as well as the helical pitch of the latter so chosen that the cords become substantially inextensible after elongating in the range of 40–45% of their initial length.

The present invention permits the complete assembly of a radial tire carcass such that the carcass may then be expanded to toroidal configuration in a single step without further assembly operations. Heretofore, special machinery has been required for assembling the tread stock to the expanded toroidal carcass prior to vulcanization. The present invention eliminates this step and, therefore, the need for any special machinery other than the conventional tire building drum.

Brief description of the drawings

FIG. 1 is an isometric view of a partial transverse section of a shaped and cured tire made in accordance with this invention with the portion of the tread stock and sidewall cut away to expose the reinforcing cords.

FIG. 2 is an enlarged perspective view of a portion of the stretchable reinforcing cord.

FIG. 3 is a partial longitudinal section of a tire building drum with the assembled tire shown at completion of lamination and ready for removal from the drum.

Detailed description

Figure 4:
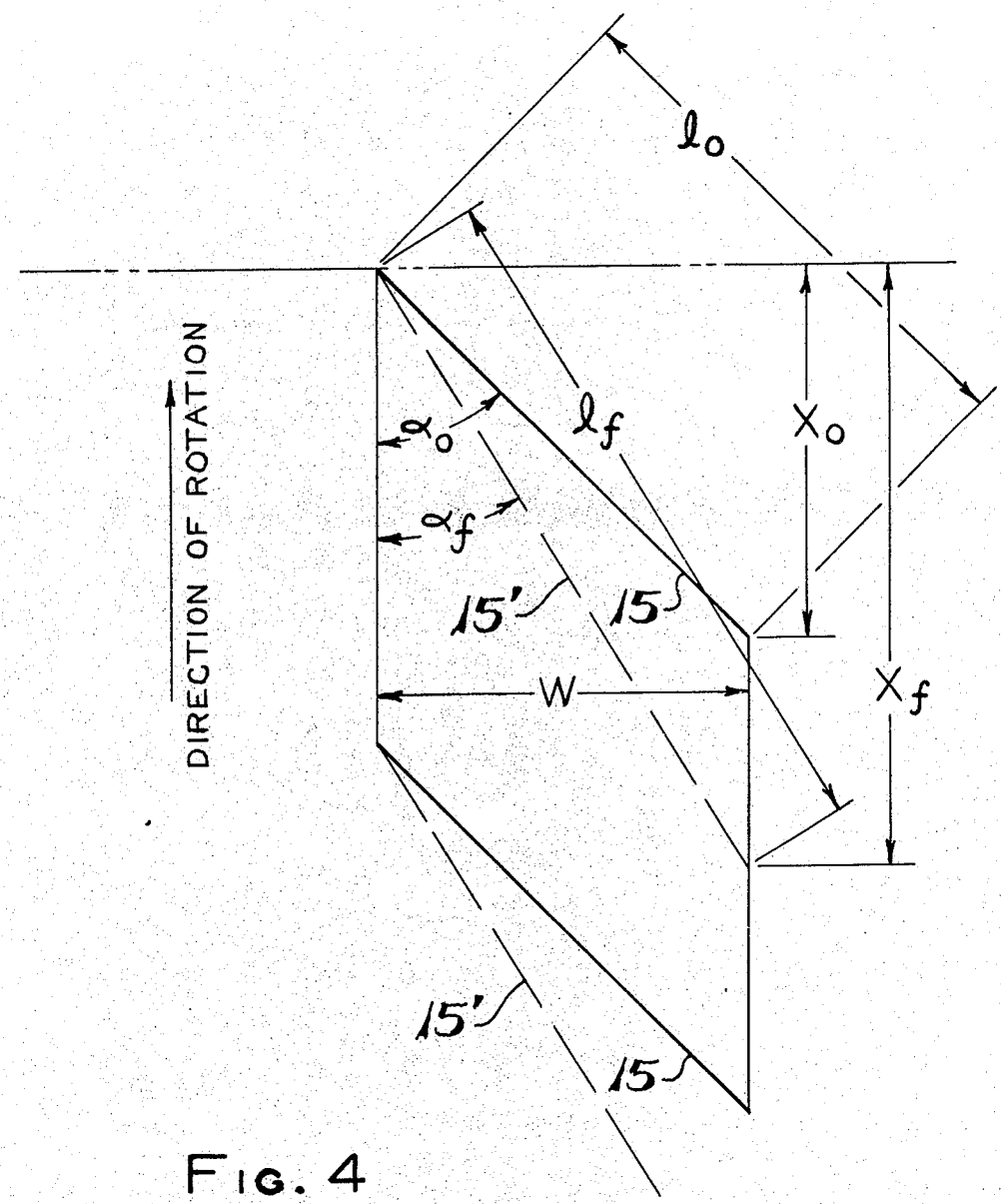
FIGURE 4 is diagrammatic showing of the mechanism whereby the stretchable cords elongate and reposition themselves during expansion.

The invention is illustrated in FIG. 1 as it is preferably embodied in a radial pneumatic tire 10 comprising a pair of axially spaced beads 11, a pair of sidewalls 12 and tread portion 13. The carcass is reinforced by substantially inextensible cords 14 preferably formed of twisted strands of rayon, nylon, polyester, wire or glass interconnecting the beads 11 and disposed in equally spaced radial planes. In the preferred form of the invention, two layers of radial cords are used; however, as few as one or more than two layers may be used as required for strength.

The tread region, and preferably the radial outer portion of the sidewalls are provided with a restrictive belt formed of reinforcing cords 15 illustrated in FIG. 2 superposed radially outwardly of the cords 14. Preferably, two pairs of layers 16 and 17 are employed with the cords 15 in each layer in parallel closely spaced relationship extending obliquely across the plane of symmetry of the tire, and with the cords in successive layers 16 ad 17 disposed at equal but opposite angles in the range of 15–18 degress relative to the circumferential plane of symmetry. Preferably, the cords are spaced at 12–20 cords per inch of width. The cords 15 are, as hereafter more particularly described, made of material having an initially low tensile modulus and are capable of abruptly changing to a substantially higher tensile modulus after an extension an amount in the range 30–70% of the initial length. In the presently preferred form, the cords extend by an amount of 40–45% for a typical passenger cord tire before the aforesaid change in modulus. The layers of cords 15 have a lateral extent at least equal to the width of the tread and at least two of the layers 16 may extend into the sidewalls 12. Even the widest two of these layers are not, however, attached to the beads but have the edges thereof in spaced relationship to the beads. Generally, in the completed tire the radially innermost pair of layers 16 of bias angle stretchable cords 15 extend axially beyond the width of the tread portion 13 to the axially widest portion of the sidewall; whereas the radially outer pair of layers 17 of bias angle stretchable cords 15 do not exceed in width the width of the tread portion of the tire and are preferably the same width as the tread portion. However, if desired, the radially inner layers 16 of stretchable cords may also be made the same width as the tread portion instead of extending into the sidewall region.

Referring now to FIG. 2, the presently preferred form of the cords 15 is shown, enlarged and in greater detail, as comprising a core 15a of vulcanized elastomeric material with yarns 15b of substantially inextensible textile material wrapped helically therearound. In the presently preferred form, the core 15a is a single filament of round transverse cross-section but may alternatively be of polygonal shape and the invention is not limited to the round configuration. Furthermore, the core 15a is not limited to a single filament of elastomeric material but may be made of two or more filaments twisted together. The textile yarns 15b, which should be multi-filaments of substantially inextensible material, are wrapped about the core 15a such that the coils of the yarns 15b are not abutted when the cord 15 is in the released configuration as shown in FIG. 2. In the preferred embodiment when the cord 15 is stretched a pre-determined amount to the region of said higher tensile modulus as above described, the core 15a assumes a helical configuration while the yarns 15b are taut and substantially extend along the axis of their initial helix. Hence, the core 15a can then be considered as being wrapped helically around the outer diameter of yarns 15.

In the presently preferred embodiment of cords 15 for a passenger car tire, the core 15a is a single filament of .023 inch diameter elastomer and the textile wrap 15b is made of three 2200 denier rayon yarns individually pre-twisted prior to helically wrapping around the core in three coaxial helices of the same pitch and pitch diameter. In the preferred practice, neither the diameter of the core 15a nor the diameter of the textile yarn 15b exceeds .050 inch in diameter and both have preferably the same diameter. The preferred spacing of the cords is obtained by using from 10–20 cords per inch of width. The invention, however, is not limited to the particular stretch cord configuration shown in FIG. 2. Any suitable cord structure may be used which has initially low tensile modulus and abruptly changes to a substantially higher modulus after a pre-determined elongation in the range 30–70% of its initial length. Further details of the preferred stretchable cord are presented in our copending application Ser. No. 670,694, filed Sept. 26, 1967, entitled "Reinforcement for Elastomeric Articles."

In practicing the present invention, the uncured tire is completely assembled, as shown in FIG. 3, on a conventional cylindrical tire building drum 30, which is substantially the diameter of the beads 11. When the uncured tire carcass is completely assembled on the building drum, the carcass is removed from the drum for further shaping and vulcanization.

In building of the tire as shown, the elastomer covered layers of reinforcing cords 14 are applied to the drum 30 with the cords 14 disposed substantially axially on the drum. For tubeless inflation, an air-impervious lining layer may be first assembled onto the drum, if desired. The bead cores with the attached flipper strips are then placed in the marginal edges of the cord layers 14 and the latter turned thereover. In the presently preferred form, two axially disposed layers of cord 14 are used; however, the invention does not require any particular number of such layers, the choice being determined by the strength requirements of the completed tire.

The belt or girdle is then applied while the carcass remains in the drum 30. This belt comprises at least two pairs of layers 16 and 17 of stretch cords 15 superposed circumferentially over the radial cord layers in a band centered intermediate the ends of the drum, with the stretch cords extending obliquely to the axis of the building drum. Preferably, the two pairs of layers 16 and 17 of stretch cords are employed making an angle in the range of 0°–30° relative to the circumferential center line of the band with the angles of the cords in successive layers equal in amount but oppositely directed. However, the invention is not limited to two pairs of layers 16 and 17 since a greater or lesser number of layers of cords 15 may be utilizied dependent upon the size and load carrying capacity of the completed tire. In the presently preferred form of the invention, the radially inner pair of layers 16 of stretchable cords 15 extends in width axially toward each bead to substantially the midpoint of the sidewall region of the carcass. When the tire is expanded to toroidal configuration, the pair of layers of stretchable cord 15 which extend into the sidewall region provide protection against separation under local impact for the underlying cords 14.

A second annular pair of layers 17 of stretchable cords 15 is then applied in radially outwardly superposed arrangement over the first pair. The second or radially outer pair 17 of layers is axially narrower in width than the radially inner pair of layers 16 such that the outer pair of layers 17 extend axially a distance not to exceed the width of the tread portion of the tire. Alternatively, if separation protection of the radial cord reinforced sidewall portion of the carcass is not desired, the inner pair of layers 16 of the stretchable cords 15 may be made to extend axially generally the same width as the radially outer pair of layers 17 of stretchable cords 15 and thereby reinforce only the tread region of the carcass with four layers of stretchable cord.

The tread stock 13 and sidewalls 12 of uncured elastomer are then applied over the cord layers completing the tire assembly. The building drum 30 is then collapsed by an internal mechanism and the uncured tire is removed from the drum in flat band form. The tire is subsequently expanded radially and shaped to substantially toroidal configuration and vulcanized by conventional procedures and apparatus now used for tires employing bias angle carcass cord reinforcement.

In shaping the tire, the crown portion of the tire increases in diameter and the beads are moved axially inward. This is possible since the cords 15 elongate to provide expansion of the carcass into the toroidal configuration and thus the inextensible axial cords 14 assume a radial arrangement in the toroidal tire.

Heretofore, it has not been possible to assemble in flat band form tread reinforcement layers of cords which make angles within the above-mentioned range with the axial mid-plane and extend over the crown region of the tire into the sidewall region and then expand the tire to toroidal configuration. The present invention permits such assembly and expansion by virtue of the extensible nature of the stretchable cords 15.

Referring now to FIG. 4, the mechanism whereby the stretchable cords 15 elongate and reposition themselves during expansion is shown diagrammatically. Typical cords 15 are shown schematically extending obliquely the width $w$ of one of the radially outer layers. The solid black lines indicate the initial angular position $\alpha_o$ and length $l_o$ of the cord when the plies containing such cords are assembled in flat band form. The dashed lines 15' illustrates the increased length $l_f$ and changed angular position $\alpha_f$ of the cord 15 when the carcass has been expanded to toroidal configuration. The width $w$ of the belt layer remains substantially unchanged during expansion or lifting of the carcass which is attributable to the ability of the cord 15 to stretch from the initial length $l_o$ to the final length $l_f$ while the cord moves angularly through an angle measured by the difference between the initial angle $\alpha_o$ and the final angle $\alpha_f$. The direction of the circumference of the tire is shown for easy reference in FIG. 4 by an arrow.

The distance the layers of cords 15 distend in the circumferential direction, or the amount of circumferential expansion, may be determined by the difference between circumferential component $X_f$ of the final cord length and the circumferential component of the initial cord length $X_o$. Thus, since the extensibility E of the cord 15 is defined as the ratio of final length $l_f$ to initial length $l_o$ and expressed as $$E = \frac{l_f}{l_o}$$

and the tire circumference expansion ratio K, defined as the ratio of the circumferential components of the cord, is $$K = \frac{X_f}{X_o}$$

and further, since $$\sin \alpha_o = \frac{w}{l_o}; \sin \alpha_f = \frac{w}{l_f}$$

$$E = \frac{l_f}{l_o} = \frac{\sin \alpha_o}{\sin \alpha_f}$$

$$\frac{w}{X_o} = \tan \alpha_o; \frac{w}{X_f} = \tan \alpha_f$$

then:

$$\frac{X_f}{X_o} = K = \frac{\tan \alpha_o}{\tan \alpha_f}$$

Hence, for example, for a 15.5 x 38 tire having an expansion ratio $K=1.38$ and a final cord angle of 18°, it will be seen that $$\tan \alpha_o = K \tan \alpha_f = 1.38 \tan 18° = .449$$

$\alpha_o = \arctan .449 = 24.2°$ which is the angle for the cords 15 in the flat-band condition of the tire.
Also, $$E = \frac{\sin \alpha_o}{\sin \alpha_f} = \frac{\sin 24.2°}{\sin 18°} = 1.33$$

which is the extension ratio required for the cords. The manner in which the number of turns per inch of the yarns 15b, the radius of the helix and other parameters of the cords 15 can be determined, to provide this desired extensibility before transition from the low to high tensile modulus, is explained in our aforementioned copending application.

In accordance with the present invention, it is, therefore, possible through use of initially stretchable reinforcing cords in the overhead belt to completely fabricate a radial tire in one position on a cylindrical building drum, substantially the diameter of the tire beads, and thereafter produce the desired inextensibility of the belt when the tire is expanded for vulcanizing.

It will be evident that the invention is capable of modifications and adaptations by those skilled in the art and therefore is limited only as required by the spirit and scope of the appended claims.

What is claimed is:

1. An uncured pneumatic tire of elastomeric material and reinforcing cords capable of being expanded to be substantially toroidal configuration, said tire comprising:
   (a) a carcass of flat-band cylindrical form including a pair of axially spaced beads with at least one layer of elastomeric material having substantially inextensible, generally axially disposed, reinforcing cords therein extending between the beads with the ends turned thereover;
   (b) a belt comprising at least two layers of elastomeric material having stretchable reinforcing cords of predetermined extensibility disposed in genrally parallel relationship in each layer with the cords in any one layer intersecting and crossing the axial midplane at an angle in the range of 0°–30° and with the cords in radially adjacent layers making equal but opposite angles with the axial mid-plane, wherein the said stretchable cords each have:
      (1) a core of at least one strand of pre-cured elastomer,
      (2) at least one yarn of substantially inextensible filaments wrapped helically about said core in substantially equally spaced open coil arrangement, and
      (3) limited and pre-determined extensibility in the range 30–70% of their initial length;
   (c) and a covering of uncured elastomer over said carcass and belt.

2. The tire as defined in claim 1, wherein the said belt has four superposed annular layers of elastomeric material having stretchable cords therein with 10–20 of said cords per inch of width of each layer.

3. The tire as defined in claim 1, wherein the core of said stretchable cords is substantially the same diameter as the said textile yarn with neither exceeding .050 inch diameter.

4. The tire as defined in claim 1 comprising: at least four added layers of said stretchable cord wherein at least two of said layers of stertchable cord extend axially toward the beads beyond the tread into the sidewall region of the tire and at least two additional layers extend axially no farther than the edges of the tread.

5. The tire defined in claim 1, wherein all the layers of said stretchable cords extend axially toward the beads no farther than the edges of the tread.

6. A pneumatic tire of vulcanized elastomeric material and reinforcing cords comprising:
   (a) a generally toroidal carcass with at least one layer of elastomeric material reinforced by substantially inextensible, generally axially disposed, reinforcing cords therein and a pair of axially spaced beads with the ends of said cords turned thereover;
   (b) a belt radially outwardly of said carcass comprising at least two layers of elastomeric material having stretchable reinforcing cords of predetermined extensibility disposed therein in generally parallel relationship in each layer with the cords in any one layer intersecting and crossing the axial midplane of the tire carcass at an angle in the range 0–30° and with the cords in radially adjacent layers making equal but opposite angles with the axial midplane, with the said stetchable chords stretched substantially to their predetermined extensibility and each comprising:
      (1) a core of at least one strand of pre-cured elastomer,
      (2) at least one yarn of substantially inextensible filaments wrapped helically about said core in substantially equally spaced open coil arrangement, and (3) the said limited and predetermined extensibility being in the range 30–70% of their initial length;
(c) and a covering of elastomer over said carcass and belt.

References Cited

UNITED STATES PATENTS

| | | | |
|---|---|---|---|
| 2,890,567 | 6/1959 | Taylor et al. | 57—140 |
| 3,380,244 | 4/1968 | Martin | 57—140 |

FOREIGN PATENTS 933,318  8/1955  Germany.

ARTHUR L. LA POINT, Primary Examiner

CHARLES B. LYON, Assistant Examiner

U.S. Cl. X.R.

57—140, 144; 152—354, 357; 161—144

Attorney's File No. 16797

PO-1050
(5/69)

UNITED STATES PATENT OFFICE
CERTIFICATE OF CORRECTION

Patent No. 3,486,546          Dated December 30, 1969

Inventor(s) James Sidles, Dennis P. Skala and Leonard Skolnik

It is certified that error appears in the above-identified patent and that said Letters Patent are hereby corrected as shown below:

Column 2, line 66, "ad" should read ---and---; line 68, "degress" should read ---degrees---; lines 70 - 71, "hereafter" should read ---hereinafter---.
Column 6, line 6, "be" should read ---a---; line 16, "genrally" should read ---generally---.

SIGNED AND
SEALED

JUN 30 1970

(SEAL)
Attest:

Edward M. Fletcher, Jr.
Attesting Officer

WILLIAM E. SCHUYLER, JR.
Commissioner of Patents